(12) United States Patent
Thomas (10) Patent No.: US 8,384,289 B2
(45) Date of Patent: Feb. 26, 2013

(54) METHOD AND SYSTEM FOR A LIGHT SENSING HEADLIGHT MODULATOR

(76) Inventor: Keith Thomas, Great Falls, VA (US)

( * ) Notice: Subject to any disclaimer, the term of this patent is extended or adjusted under 35 U.S.C. 154(b) by 522 days.

(21) Appl. No.: 12/390,298

(22) Filed: Feb. 20, 2009

(65) Prior Publication Data

US 2010/0213846 A1 Aug. 26, 2010

(51) Int. Cl.
*B60Q 1/02* (2006.01)
(52) U.S. Cl. ............................ 315/82; 315/149; 315/159
(58) Field of Classification Search .................... 315/82, 315/76, 149, 159, 291, 307; 359/601, 603, 359/604, 613, 614; 250/214 D
See application file for complete search history.

(56) References Cited

U.S. PATENT DOCUMENTS

| | | | | |
|---|---|---|---|---|
| 3,842,397 A * | 10/1974 | Sindle | ........................... | 367/111 |
| 5,430,450 A | 7/1995 | Holmes | | |
| 6,379,013 B1 * | 4/2002 | Bechtel et al. | ................ | 359/604 |
| 6,403,942 B1 * | 6/2002 | Stam | ........................ | 250/214 AL |
| 7,047,132 B2 * | 5/2006 | Jacobs | ........................... | 701/301 |
| 2002/0118182 A1 | 8/2002 | Weindorf | | |

\* cited by examiner

*Primary Examiner* — Daniel D Chang
(74) *Attorney, Agent, or Firm* — Hunton & Williams LLP (57) ABSTRACT

Techniques for providing a method and system for light sensing vehicle light modulator are disclosed. In one particular exemplary embodiment, the techniques may be realized as a method, comprising detecting incoming light utilizing a plurality of light sensors operatively connected to an vehicle, measuring the incoming light intensity, and decreasing a intensity of light output by one or more lights of the vehicle based at least in pan on a measurement of the incoming light intensity.

20 Claims, 5 Drawing Sheets

METHOD AND SYSTEM FOR A LIGHT SENSING HEADLIGHT MODULATOR

BACKGROUND INFORMATION

Vehicle headlights can be a significant distraction to other drivers when driving at night. Other vehicles may approach a first driver from several different angles and may temporarily impair the vision of the first driver. Other drivers may not regulate their headlights when approaching (e.g.—switch from high beam to low beam, turn off fog lights) a first driver. Requiring other drivers to regulate their headlights when approaching a first vehicle may be unreliable and may be a distraction to other drivers. Automating the regulation of one or more vehicle lights may face several challenges. It may be difficult to determine whether an object is another vehicle, the location of another object, and the proximity of another object to a vehicle.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a system for automatically modulating vehicle light output intensity.

Figure 1:
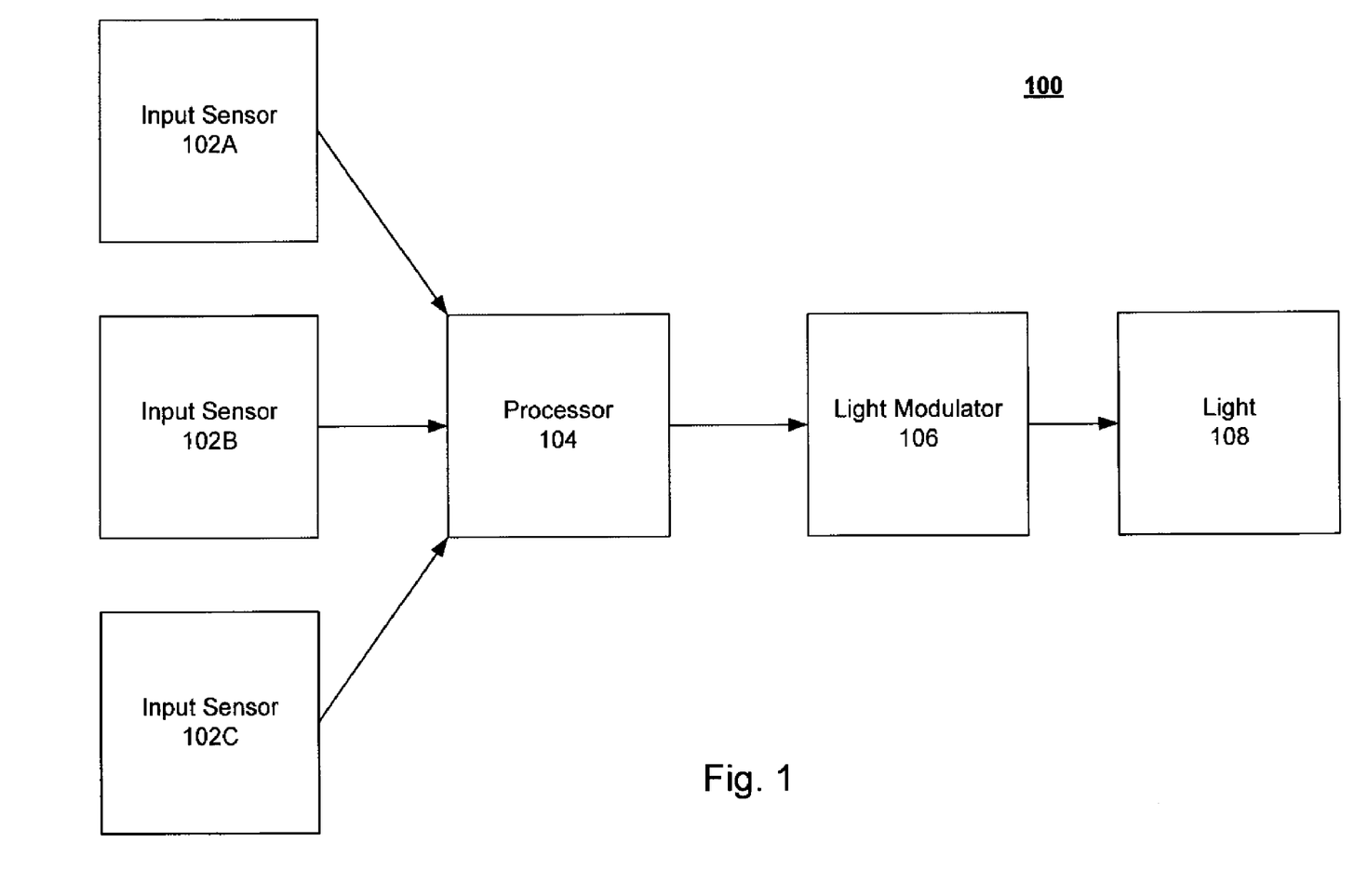
FIG. 1 is a schematic of a system for automatically modulating vehicle light output intensity, in accordance with an exemplary embodiment.

Referring to FIG. 1, a system 100 for automatically modulating vehicle light output intensity is illustrated, in accordance with an exemplary embodiment.

Processor 104 may receive input from one or more sensors, such as input sensor 102A, 102B, and 102C. Processor 104 may be communicatively coupled with light modulator 106. Light modulator 106 may be communicatively coupled with one or more light sources, such as light source 108.

Input sensors 102A, 102B, and 102C may be light sensors, radar emitting devices, radar detecting devices, combinations of such elements, or other light detecting and/or proximity detecting devices. Input sensors 102A, 102B, and/or 102C may be arranged in different locations of a vehicle which may enable the detection of light originating from a plurality of locations. For example, input sensor 102A may be a sensor located on a left side or a front left corner of a vehicle. Input sensor 102B may be a sensor located on the front of the vehicle. Input sensor 102C may be a sensor located on a right side of a vehicle. Input sensors 102A, 102B, and/or 102C may detect light approaching from the front, the left side, and/or right side of the vehicle. In one or more embodiments, input sensors 102A, 102B, and/or 102C may detect the proximity of another object such as a vehicle, by using radar. For example, one or more sensors may be radar emitting devices, such as Doppler radar transmitters, or radar detecting devices, such as Doppler radar receivers. Input sensors 102A, 102B, and 102C may provide radar data, light input data and/or other data to processor 104.

Processor 104 may receive input from input sensors 102A, 102B, and/or 102C. Processor 104 may additionally receive input from other devices associated with an vehicle, such as a speedometer, a headlight control, a vehicle gear indicator, or other devices associated with a vehicle. For example, processor 104 may determine a speed of the vehicle using radar. In one or more embodiments, processor 104 may utilize radar to determine a velocity of the first vehicle. For example, processor 104 and/or input sensors 102A, 102B, and/or 102C may determine a velocity of the first vehicle by examining a radar return signal of ground clutter (e.g., the road and other stationary objects). In other embodiments, processor 104 may utilize other sensors of the first vehicle, such as a speed sensor, to determine the first vehicle velocity. Processor 104 may determine the proximity of a radar reflecting object by determining a change in velocity of the radar reflecting object from the first vehicle containing processor 104. Based upon a calculated change in velocity and a known velocity of the first vehicle containing processor 104, processor 104 may determine whether the radar reflecting object is moving.

In one or more embodiments, processor 104 may perform a fast fourier transform or other time to frequency domain transforms on one or more received radar signals. In one or more embodiments, other elements, such as sensors 102A, 102B, and/or 102C may perform the time to frequency domain transforms. Processor 104 may also utilize the Doppler effect to determine relative velocities of one or more objects.

Processor 104 may be communicatively coupled to light modulator 106. If one or more conditions are met, processor 104 may provide instructions to light modulator 106 or may utilize light modulator 106 to dim one or more lights, such as light source 108. For example, processor 104 may utilize light modulator 106 to dim one or more lights if a moving radar reflecting object is detected and is within a specified proximity. The determination of whether the object is moving may avoid dimming lights for stationary objects and may dim lights for objects more likely to be other moving vehicles. Processor 104 may determine whether a radar reflecting object is moving towards the first vehicle or away from the first vehicle. In one or more embodiments, processor 104 may not modulate one or more lights if the radar reflecting object is moving away from the first vehicle. Other factors may be taken into consideration by processor 104 such as an ambient light level or a headlight setting of the first vehicle. The ambient light level may be determined by one or more sensors, such as input sensors 102A, 102B, and/or 102C, and lights may not be dimmed if an ambient light level is at or beyond a specified threshold level. In one or more embodiments, processor 104 may receive input indicating the setting of one or more light controls. For example, if headlights, fog lights or other lights are turned off, processor 104 may not attempt to modulate one or more lights. According to at least one embodiment, if one or more lights are set on a low setting (e.g., low beams on headlights) processor 104 may not modulate one or more lights. Processor 104 may consider light input received from one or more sensors and may modulate one or more lights if received light input is at or beyond a specified threshold level. Processor 104 may modulate one or more lights based on a combination of factors. For example, processor 104 may use light modulator 106 to modulate one or more lights based on the proximity of a moving radar reflecting object and detection of light beyond a specified level from an approximate angle of the radar reflecting object.

According to one or more embodiments, light modulator 106 may modulate light 108 by switching between different settings, such as a high beam, a low beam, and/or an off setting. According to some embodiments, light modulator 106 may increase and/or decrease light 108 linearly as directed by processor 104. According to at least one embodiment, light modulator 106 may increase and/or decrease light 108 in logarithmic increments. For example, one or more input sensors 102A, 102B and/or 102C may provide inputs to processor 104 in logarithmic increments and processor 104 may utilize light modulator 106 to modulate light 108 in such increments. Other steppings or increments may be utilized.

In one or more embodiments, vehicle light modulation may be performed without processor 104. For example, one or more input sensors, such as input sensors 102A, 102B, and/or 102C, may raise a voltage level on a circuit beyond a specified level. This increase in voltage level may occur from voltage added to a circuit by a light sensor detecting light input. The increased voltage may exceed a level of a resistor, such as a preset resistor, and may cause a change in circuit flow and a corresponding light modulation. The change in circuit flow may be facilitated by the use of NPN transistors and/or other circuit components. An NPN transistor may consist of two negatively biased "N" semiconductor layers with a positively biased "P" layer semiconductor layer shared in between the two "N" semiconductor layers. The emitter base junction of the NPN transistor may be forward biased and the base collector junction may be reverse biased.

The various components of the system 100 as shown in FIG. 1 may be further duplicated, combined and/or integrated to support various applications and platforms. Additional elements may also be implemented in the systems described above to support various applications.

Figure 2:
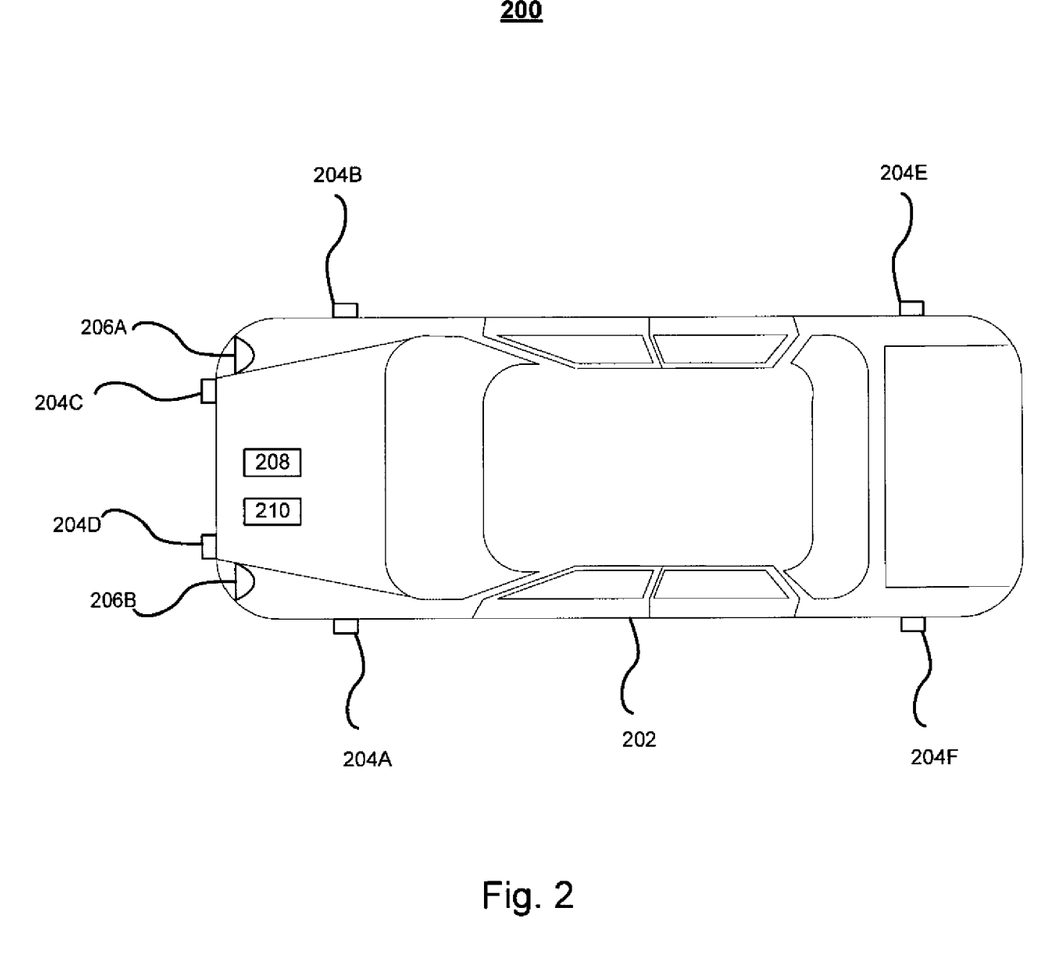
FIG. 2 is a diagram of a vehicle implementing a system for automatically modulating vehicle light output intensity, in accordance with an exemplary embodiment.

Referring to FIG. 2, a diagram of a vehicle implementing a system for automatically modulating vehicle light output intensity is depicted, in accordance with an exemplary embodiment. Vehicle 202 may contain a plurality of sensors 204, such as sensors 204 A-F. One or more sensors 204 may be communicatively coupled to processor 208 and/or light modulator 210. Light modulator 210 may be communicatively coupled to one or more lights, such as lights 206A and 206B.

Sensors 204 may be located in a plurality of locations on vehicle 202, which may enable the detection of vehicles in a plurality of directions. Sensors 204 may be light sensors, radar emitting devices, such as Doppler radar transmitters, or radar detecting devices, such as Doppler radar receivers. Processor 208 may be aware of the location of one or more sensors 204 and the location of one or more lights relative to the sensors. In determining whether light modulation is required, processor 208 may utilize logic evaluating received input, such as light from a sensor or the proximity of a moving object from a radar transmitter and a radar receiver or antenna, together with the location of one or more lights of vehicle 202. For example, processor 208 may utilize a proximity and a direction of a radar reflecting object in a determination of whether to modulate one or more lights of vehicle 202. In one or more embodiments, if a detected object is detected by sensor 204F and 204A but not 204D a determination may be made not to modulate lights 206A and/or 206B utilizing light modulator 210. If processor 208 determines that the velocity of a detected object will place it in a position affected by lights 206B and 206A within a specified period of time (e.g., a passing car is detected alongside), processor 208 may utilize light modulator 210 to modulate lights 206A and/or 206B. Other logic may be employed. For example, a determined velocity and/or proximity of an object with lights below a specified level may indicate whether a driver of a second vehicle may be affected by the lights of vehicle 202.

Figure 3:
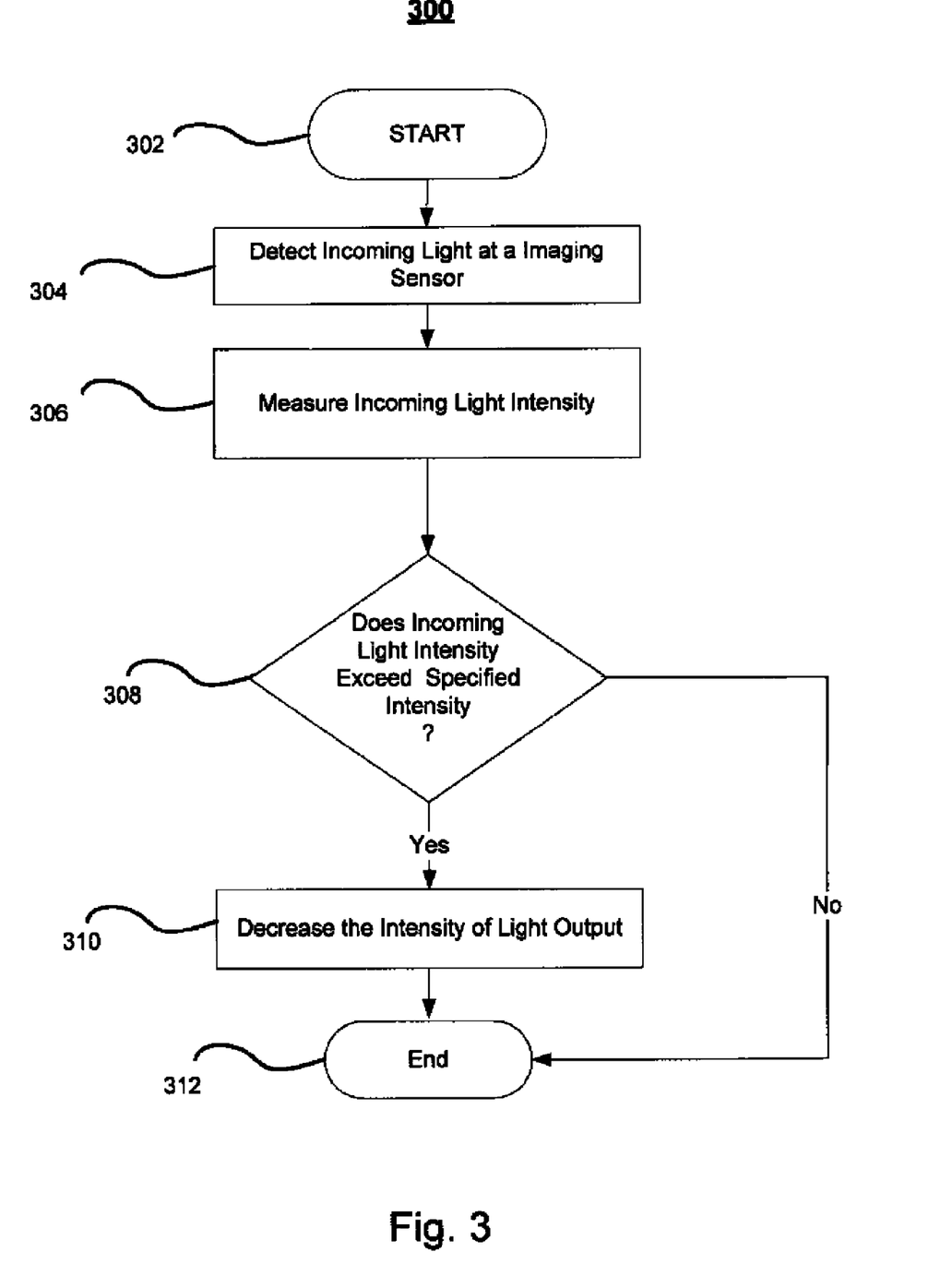
FIG. 3 depicts a flowchart of a method for automatically modulating vehicle light output intensity, in accordance with an exemplary embodiment.

FIG. 3 depicts a flowchart of a method for implementing a system 300 for automatically modulating vehicle light output intensity, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3 the exemplary method 300 may begin at block 302.

At block 304, the method 300 may detect incoming light at a light sensor. The light sensor may be a photodetector such as a photodiode, a photoresistor, a phototransistor, a solar cell, a solar panel, a Light Dependent Resistor (LDR) and/or a photovoltaic cell. In one or more embodiments, a plurality of light sensors may be utilized.

At block 306, the method 300 may measure the intensity of incoming light. In one or more embodiments, the intensity may be measured in terms of voltage or current generated by a sensor. The measurement may be performed by a processor, such as processor 104 or processor 208. According to one or more embodiments, a measurement may be performed by a circuit utilizing a combination of transistors and/or resistors to alter current flow depending on voltage levels. For example, an arrangement of bi-polar transistors, such as NPN transistors may be used in conjunction with variable or preset resistors to provide to alternate paths of current flow depending on a voltage level.

At block 308, the method 300 may determine whether incoming light intensity exceeds a specified level. If the light intensity exceeds a specified level, the method 300 may proceed to block 310. If the measured light intensity does not exceed a specified level, the method 300 may end at block 312.

At block 310, the method 300 may decrease the intensity of light output. One or more methods of light modulation may be utilized. An alternating current flow may change between a low an high beam. In one or more embodiments, one or more light sources may be turned off and/or alternate light sources may be utilized (e.g., different lamps may be used for a low beam or a high beam). In some embodiments, a single light or set of lights may be utilized for both a lower and higher beam and the selection may be determined by a voltage level or a direction of current.

At block 312, the method may end.

Figure 4:
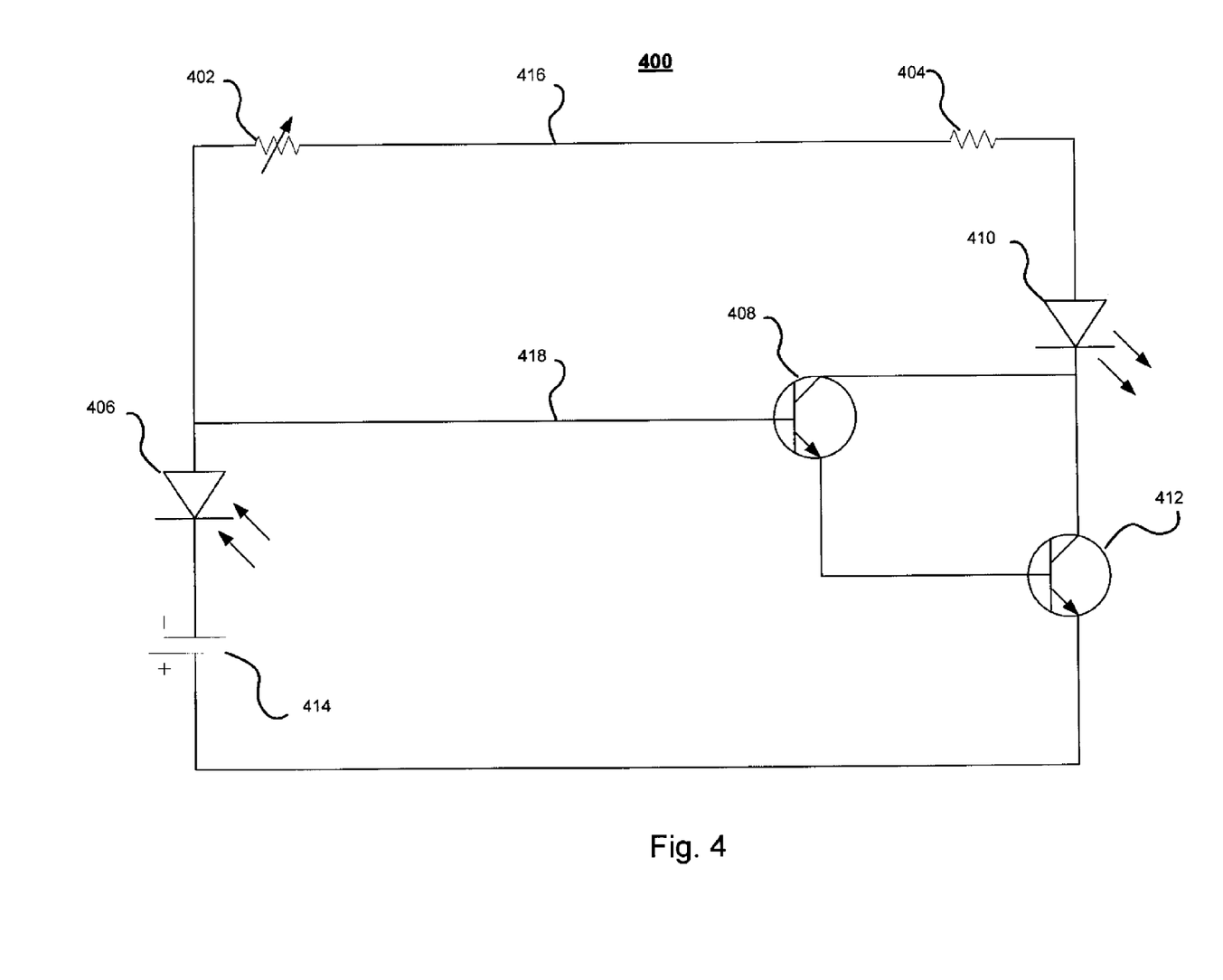
FIG. 4 depicts a circuit diagram for automatically modulating vehicle light output intensity, in accordance with an exemplary embodiment.

Referring to FIG. 4, a circuit diagram for automatically modulating vehicle light output intensity is depicted, in accordance with an exemplary embodiment. Circuit 400 may contain a plurality of components including photodetector 406, voltage source 414, variable resistor 402, resistor 404, NPN transistors 408 and 412, and light source 410.

In one or more embodiments, circuit diagram may be a high beam modulation circuit and current may normally flow from voltage source 414 across variable resistor 402, circuit path 416, and resistor 404 to light source 410. Light source 410 may be an LED (Light Emitting Diode) or other light source that may emit different levels of light when the bias is reversed. When current flows across variable resistor 402, light path 416 and resistor 404 to light source 410, light source 410 may emit a high level of light, such as a high beam. When photodetector 406 receives light it may convert it to current and may increase the voltage on the circuit. When the voltage level exceeds a specified level, current may flow across circuit path 418, NPN transistor 408 and NPN transistor 412 to light source 410. This may cause light source 410 to emit a low level of light, such as a low beam. In one or more embodiments, this may reverse the bias of light source 410 to cause it to emit a lower level of light. In some embodiments, the threshold may be adjusted by changing a setting of variable resistor 402. In one or more embodiments, photodetector 406 may have a fixed resistance value. In other embodiments, photodetector 406 may have a variable resistance value.

According to one or more embodiments, circuit 400 may be used in conjunction with other sensors, light sources, and/or one or more processors. According to one or more embodiments, a plurality of sensors, such as for example, a plurality of photodetectors 406 may be connected in parallel. This may enable the placement of photodetectors in multiple locations on a vehicle. In one or more embodiments, a photodetector may be connected in parallel with other types of sensors.

Figure 5:
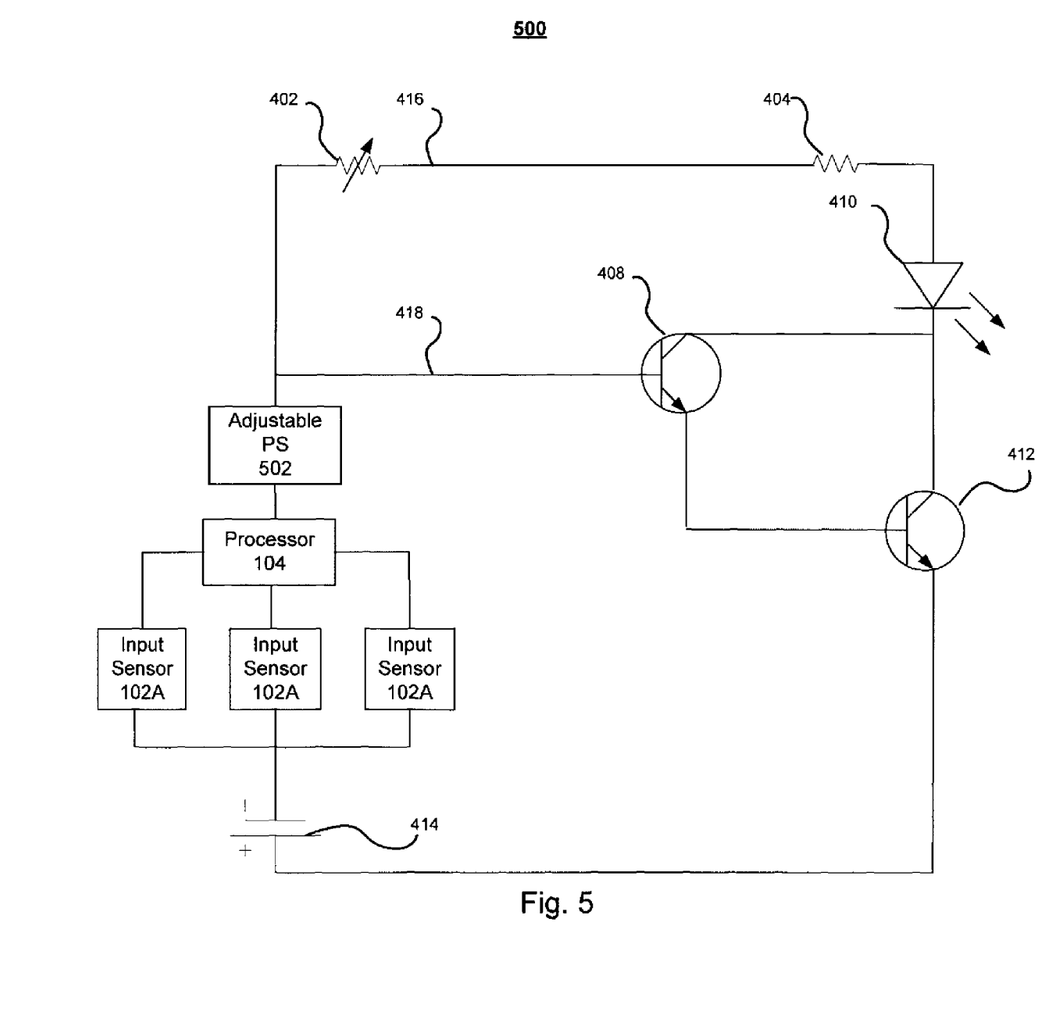
FIG. 5 depicts a circuit diagram for automatically modulating vehicle light output intensity, in accordance with an exemplary embodiment.

Referring to FIG. 5, a circuit diagram for automatically modulating vehicle light output intensity is depicted, in accordance with an exemplary embodiment. Circuit 500 may contain a plurality of components including processor 104, input sensor 102A, 102B, and 102C, adjustable power supply (PS) 502, voltage source 414, variable resistor 402, resistor 404, NPN transistors 408 and 412, and light source 410.

As described above in reference to FIG. 1, input sensors 102A, 102B, and 102C may be light sensors, radar emitting devices, radar detecting devices, combinations of such elements, or other light detecting and/or proximity detecting devices. Input sensors 102A, 102B, and/or 102C may be arranged in different locations of a vehicle which may enable the detection of light originating from a plurality of locations. In one or more embodiments, input sensors 102A, 102B, and/or 102C may detect the proximity of another object such as a vehicle, by using radar. For example, one or more sensors may be radar emitting devices or may be operatively connected to radar emitting devices, such as Doppler radar transmitters. Input sensors 102A, 102B, and/or 102C may be radar detecting devices, such as Doppler radar receivers. Input sensors 102A, 102B, and 102C may provide radar data, light input data and/or other data to processor 104. One or more input sensors 102 may be arranged in parallel, in series, or otherwise connected to a vehicle light modulation circuit. As shown in FIG. 5, input sensors 102A, 102B, and 102C may be arranged in parallel in circuit 500.

As described above in reference to FIG. 1, processor 104 may receive input from input sensors 102A, 102B, and/or 102C. Processor 104 may additionally receive input from other devices associated with an vehicle. As shown in FIG. 5, processor 104 may be operatively connected to adjustable power supply (PS) 502. Current may flow from voltage source 414 across variable transistor 402, circuit path 416 and transistor 404 to light source 402, which may cause light source 410 to emit a high level of light. Processor 104 may receive input from one or more sensors and may utilize adjustable power supply to adjust voltage on circuit 500. For example, processor 104 may utilize one or more portions of stored logic to increase a voltage level utilizing adjustable power supply 502. In this example, the increased voltage may operate to meet or exceed a threshold level of NPN transistor 408 which may cause current to flow across circuit path 418, NPN transistor 408 and NPN transistor 412 to light source 410. This may cause light source 410 to emit a low level of light, such as a low beam. In one or more embodiments, this may reverse the bias of light source 410 to cause it to emit a lower level of light. Processor 104 may utilize logic to analyze one or more inputs, such as from input sensors 102A, 102B, and/or 102C, which may include a light level received from a photodetector, a radar return signal, an ambient light level, a vehicle light setting, a vehicle velocity, a time of day, or other inputs. Processor 104 may determine the proximity of a moving object, a velocity of a moving object relative to a vehicle, a light level received, whether the light level is increasing or decreasing or other determinations. Based on one or more determinations, processor 104 may modulate light source 410 utilizing adjustable power supply 502 and circuit 500. Processor 104 may be programmable enabling a user to adjust logic and thresholds controlling the light modulation.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for modulating vehicle light output intensity, comprising:
   detecting incoming light from a second vehicle utilizing a plurality of light sensors operatively connected to a first vehicle, wherein the plurality of light sensors are distributed throughout the front, left front, left rear, right front, and right rear sides of the first vehicle;
   measuring the incoming light intensity; and
   decreasing an intensity of light output by one or more lights of the first vehicle based at least in part on a measurement of the incoming light intensity from the second vehicle.

2. The method of claim 1, wherein the intensity of light output is decreased in the event the measurement of incoming light intensity exceeds a specified threshold.

3. The method of claim 2, wherein the specified threshold is measured by a preset resistor.

4. The method of claim 1, wherein an NPN transistor is utilized to decrease the light intensity.

5. The method of claim 1, wherein the plurality of light sensors are arranged on the front, left front, left rear, right front, and right rear sides of the first vehicle to detect incoming light directed towards the front and sides of the first vehicle.

6. The method of claim 1, further comprising:
   utilizing a radar transmitting device to transmit one or more radar signals from the first vehicle;
   utilizing a radar detecting device on the first vehicle to receive one or more reflected radar signals from the second vehicle such that the second vehicle is a radar reflecting object;

calculating, using a processor, the proximity of the radar reflecting object from the radar transmitting device; and modulating the intensity of the light output of the first vehicle based at least in part on the proximity of the radar reflecting object.

7. The method of claim 6, wherein the proximity of the radar reflecting object is calculated by determining a change in velocity of the radar reflecting object from the first vehicle.

8. The method of claim 7, further comprising:

determining whether the radar reflecting object is moving based on the change in velocity of the radar reflecting object from the first vehicle; and in the event the radar reflecting object is moving, modulating the intensity of the light output of the first vehicle based at least in part on the proximity of the radar reflecting object.

9. The method of claim 6, further comprising:

determining an approximate angle of the incoming light source relative to a base plane of one or more light sensors; and transmitting radar in a range including the approximate angle of the incoming light source to determine the proximity of the incoming light source.

10. The method of claim 1, wherein the intensity of light output is decreased proportionately to the measurement of incoming light intensity, and wherein one or more decreases of light output are decreased in logarithmic increments utilizing a logarithmic sensor.

11. A system for modulating vehicle light output intensity, comprising:

a plurality of light sensors operatively connected to a first vehicle for detecting incoming light from a second vehicle, wherein the plurality of light sensors are distributed throughout the front, left front, left rear, right front, and right rear sides of the first vehicle;

control circuitry for measuring the incoming light intensity; and a modulator for decreasing intensity of light output of one or more lights of the first vehicle based at least in part on the measured incoming light intensity of the second vehicle.

12. The system of claim 11, wherein the intensity of light output is decreased if the measurement of incoming light intensity exceeds a specified threshold.

13. The system of claim 11, wherein the control circuitry comprises a preset resistor.

14. The system of claim 11, wherein the modulator comprises an NPN transistor.

15. The system of claim 11, wherein the plurality of light sensors are arranged on the front, left front, left rear, right front, and right rear sides of the first vehicle to detect incoming light directed towards the front and sides of the first vehicle.

16. The system of claim 11, further comprising:

a radar transmitting device on the first vehicle;

a radar detecting device on the first vehicle for receiving reflected radar signals from the second vehicle such that the second vehicle is a radar reflecting object; and a processor for calculating the proximity of the radar reflecting object from the radar transmitting device, wherein the processor utilizes the modulator to modulate the intensity of the light output of the first vehicle based at least in part on the proximity of the radar reflecting object.

17. The system of claim 16, wherein the processor is further configured to calculate the proximity of the radar reflecting object by determining a change in velocity of the radar reflecting object from the first vehicle.

18. The system of claim 17, wherein the processor is further configured to:

determine whether the radar reflecting object is moving based on the change in velocity of the radar reflecting object from the first vehicle; and wherein the modulator modulates the intensity of the light output based at least in part on the proximity of the radar reflecting object in the event the radar reflecting object is moving.

19. The system of claim 16, wherein the processor is further configured to:

determine an approximate angle of the incoming light source relative to a base plane of one or more light sensors; and wherein the radar transmitting device transmits radar in a range including the approximate angle of the incoming light source.

20. The system of claim 11, wherein the modulator is further configured to:

decrease the intensity of light output proportionate to the measurement of incoming light intensity, and receive input from a logarithmic sensor to provide one or more decreases of light output in logarithmic increments.

* * * * *

UNITED STATES PATENT AND TRADEMARK OFFICE
CERTIFICATE OF CORRECTION

Page 1 of 1

PATENT NO. : 8,384,289 B2
APPLICATION NO. : 12/390298
DATED : February 26, 2013
INVENTOR(S) : Thomas

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this
Twenty-fifth Day of November, 2014

Michelle K. Lee
*Deputy Director of the United States Patent and Trademark Office*